W. H. TILLSON.
OVERSHOE ATTACHMENT.
APPLICATION FILED APR. 1, 1918.
1,280,900.
Patented Oct. 8, 1918.
3 SHEETS—SHEET 1.
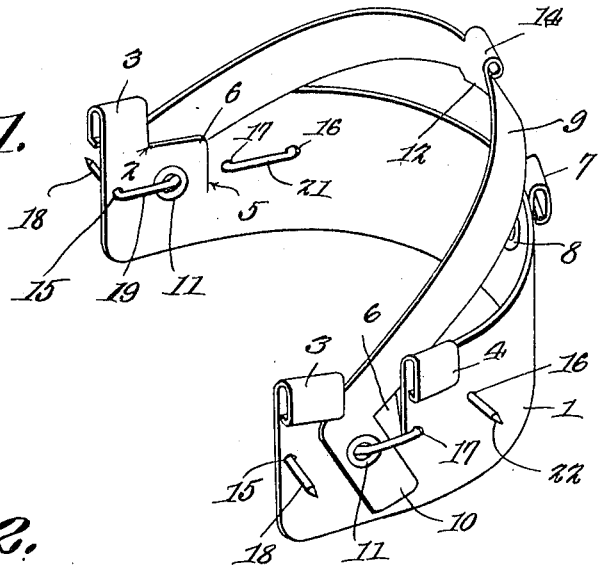
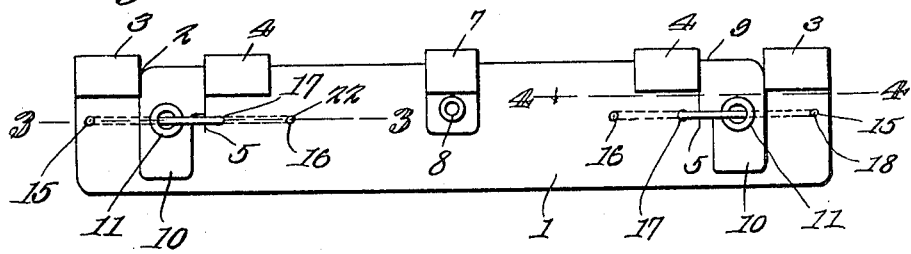
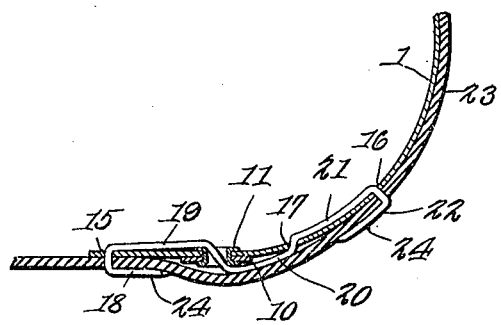
W. H. Tillson, Inventor,

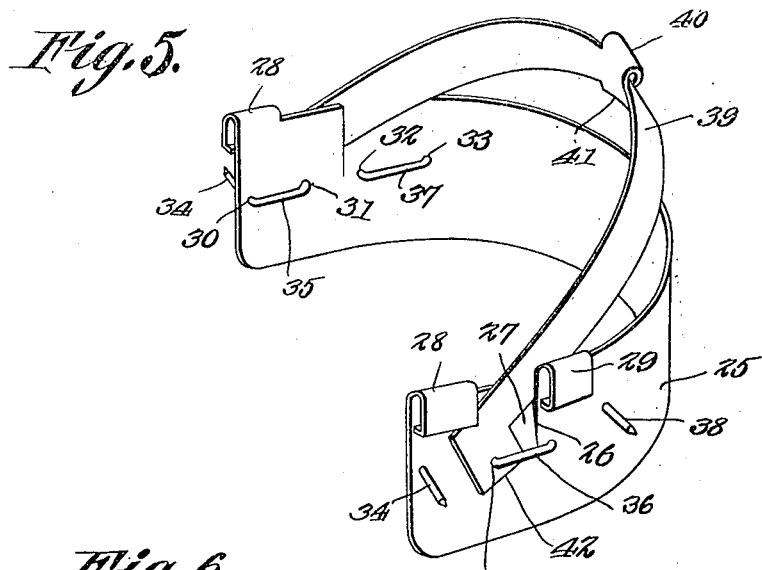
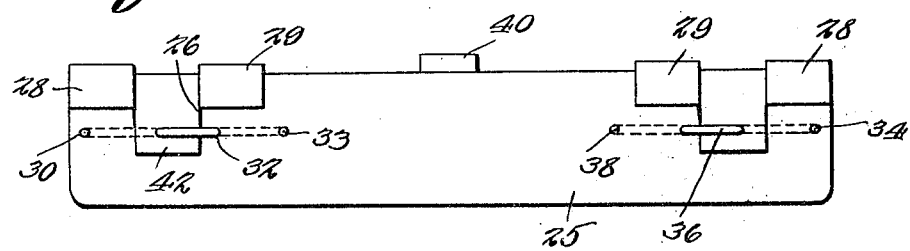
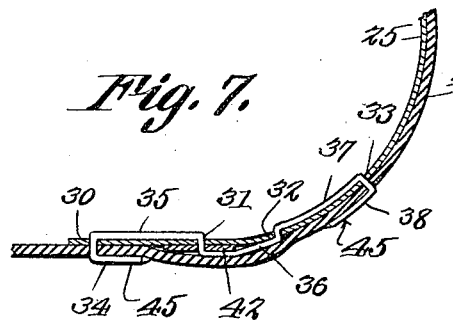

W. H. TILLSON.
OVERSHOE ATTACHMENT.
APPLICATION FILED APR. 1, 1918.
1,280,900.
Patented Oct. 8, 1918.
3 SHEETS—SHEET 3.
Fig. 9.
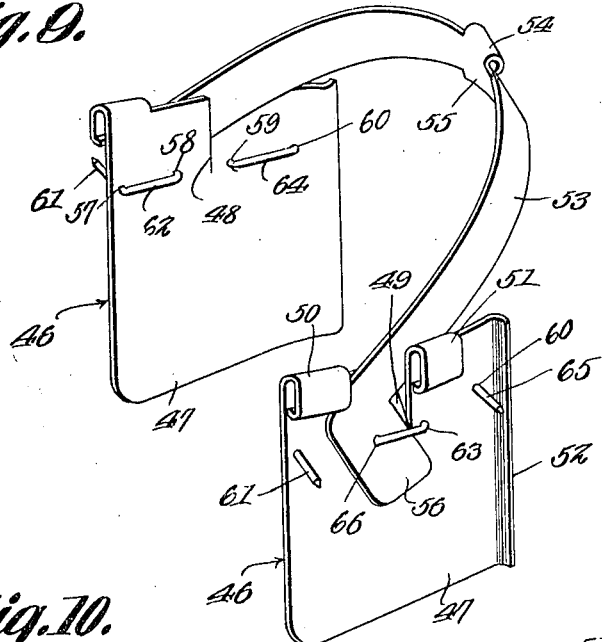
Fig. 10.
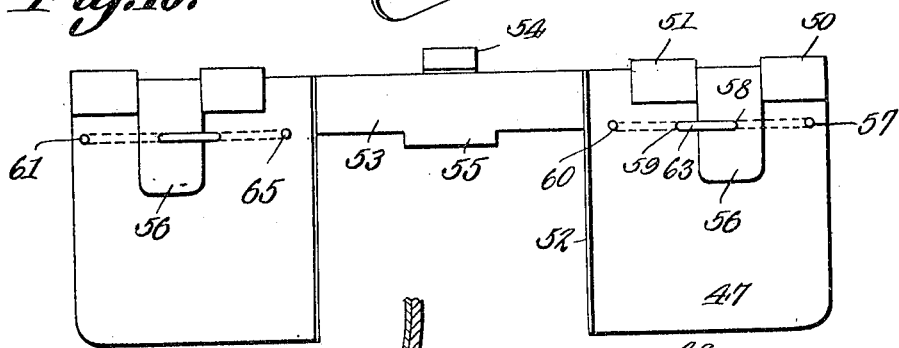
Fig. 12.
Fig. 11.
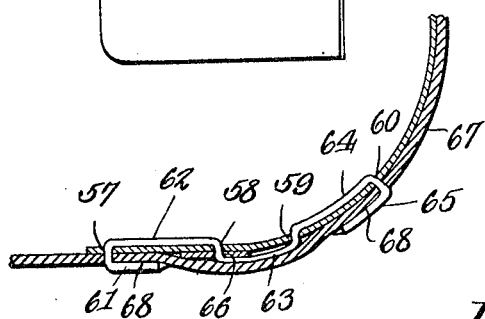
W. H. Tillson, Inventor,
Witness
By C. A. Snow & Co.
Attorneys.

UNITED STATES PATENT OFFICE.

WILLIAM H. TILLSON, OF QUINCY, ILLINOIS.

OVERSHOE ATTACHMENT.

1,280,900.   Specification of Letters Patent.   Patented Oct. 8, 1918.

Application filed April 1, 1918. Serial No. 226,022.

*To all whom it may concern:*

Be it known that I, WILLIAM H. TILLSON, a citizen of the United States, residing at Quincy, in the county of Adams and State of Illinois, have invented a new and useful Overshoe Attachment, of which the following is a specification.

The device forming the subject matter of this application is adapted to be mounted on an overshoe or rubber for the purpose of holding the overshoe or rubber on the foot of the wearer and one object of the invention is to improve the construction of the bail whereby the necessary retaining effect is produced. The invention aims to improve the mounting of the bail, to improve the construction of the body member and the means whereby the body member is held on the overshoe and, generally, to improve and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawings:—

Figure 1 is a perspective view showing one form of the invention;

Fig. 2 is a plan wherein the structure delineated in Fig. 1 is shown flattened out, the bail being swung downwardly behind the body member;

Fig. 3 is a section taken approximately on the line 3—3 of Fig. 2, the structure being curved and being shown assembled with a part of an overshoe;

Fig. 4 is a section taken approximately on the line 4—4 of Fig. 2;

Fig. 5 is a perspective view showing a modified form of the invention;

Fig. 6 is a plan wherein the structure delineated in Fig. 5 is shown flat, the bail being swung downwardly behind the body member;

Fig. 7 is a fragmental longitudinal section, showing the structure assembled with a part of an overshoe;

Fig. 8 is a fragmental section taken through one end of the device;

Fig. 9 is a perspective view showing a modified form of the invention;

Fig. 10 is a plan of the structure shown in Fig. 9, the same being laid out flat;

Fig. 11 is a fragmental longitudinal section wherein the structure depicted in Fig. 9 is shown assembled with a part of an overshoe; and Fig. 12 is a fragmental section taken through one end of the device.

In carrying out the invention as shown in Figs. 1 to 4 both inclusive, there is provided a body 1 which, preferably, is in the form of a flexible metal strip provided adjacent its ends and in its upper edge with notches 2. On each side of each notch, 2, the body 1 is supplied with integrally formed clips, denoted respectively by the numerals 3 and 4, the clips 3 and 4 being fashioned by extending the constituent material of the body 1 outwardly, downwardly and inwardly, as clearly disclosed in Fig. 1. In the body 1 adjacent the clips 4, slits 5 are formed, at the base of the notches 2, the material of the body 1 being bent inwardly at the slits 5, as shown at 6. The intermediate portion of the body 1 carries a clip 7, shaped like the clips 3 and 4 but, if desired, attached to the body 1 by means of a tubular rivet 8, or otherwise.

The numeral 9 marks an arcuate bail preferably made out of bendable metal and including depending arms 10 united by means of tubular rivets 11 with the body 1, the rivets being located below the notches 2. Intermediate its ends, the bail 9 is provided with a depending lip 12, above which is located a finger piece 14.

Close to its ends, the body 1 is equipped with outer openings 15. Inner openings 16 are fashioned in the body 1 and in the body 1 there are intermediate openings 17 interposed between the openings 16 and the notches 2. Holding members are provided, the same preferably being in the form of strips of wire. One end of each strip is extended outwardly through the opening 15 to form a prong 18. Thence, the length of wire is carried longitudinally along the inner surface of the body 1 from the opening 15 to the tubular rivet 11, and is extended outwardly through the rivet 11, that portion of the wire which lies along the inner surface of the body 1 being denoted by the numeral 19. From the tubular rivet 11, the length of wire extends, as shown at 20, along the outer surface of the body 1, to the opening 17, as shown at 20, the wire passing through the opening 17 and extending, as shown at 21, along the inner surface of the body, the wire extending outwardly through the opening 16 to form a prong 22.

In practical operation, the body 1 is placed inside of an overshoe 23, at the heel thereof. The clips 3, 4 and 7 are engaged with or clenched upon the upper edge of the overshoe. The prongs 18 and 22 extend outwardly through the overshoe and are clenched down as shown at 24 in Fig. 3 on the outer surface of the overshoe. When it is desired to use the bail 9 for holding the overshoe in place on the foot of a wearer, the bail is swung upwardly into the position shown in Fig. 1. When the bail 9 is not in use, the same is swung downwardly within the curved body 1. When the bail 9 is swung downwardly as aforesaid, the bail enters the slit 5, and the inwardly bent portions 6 of the body 1 serve to guide the bail into place.

The bail, further, is guided within the contour of the body 1 by the action of the lip 12 which coacts with the curved top of the clip 7 when the bail is swung downwardly. Attention is directed to the fact that the holding member passes through the rivets 11. This construction is useful for two reasons. First, it renders unnecessary, the fashioning of an extra opening for the passage of the holding member, and, further, the strength of the pivotal connection between the bail 9 and the body 1 is enhanced. Should the rivet 11 become loosened or inefficient, that portion of the holding member which passes through the arm 10 of the bail will still be effective to form a pivotal mounting for the bail.

In carrying out the invention as shown in Figs. 5 to 8 both inclusive, there is provided a body 25, preferably in the form of a flexible strip of metal provided in its upper edges and adjacent its ends with slits 26, the constituent material of the body 25 being flexed inwardly, adjacent the slits, as shown at 27. The upper edge of the body 25 is supplied, on opposite sides of the slits 26 with clips 28 and 29, the slits 26 being located close to the clips 29. In the body 25 near to the ends thereof are formed openings 30. Openings 31 are formed in the body 25 to the rear of the openings 30, the body having openings 32 disposed to the rear of the openings 31, and there being openings 33 in the body, to the rear of the openings 32.

The invention comprises holding members preferably in the form of lengths of wire, one end of each holding member being extended outwardly through the openings 30 to form a prong 34. Thence, the length of wire extends as shown at 35 along the inner side of the body 25 and is prolonged outwardly through the openings 31, the length extending as shown at 36 along the outer surface of the body and being passed through the opening 32, the length of wire passing along the inner surface of the body as shown at 37, and being extended outwardly through the opening 33 to form a prong 38.

The numeral 39 denotes an arcuate bail preferably made of flexible metal and supplied intermediate its ends and upon its upper edge with a finger piece 40. Below the finger piece 40, the bail 39 is supplied with a depending lip 41. The bail includes depending arms 42 mounted to swing on those portions of the holding members which pass through the openings 31, the arms having openings 43 which, together with the said portions of the holding members, afford the pivotal mountings for the bail.

The numeral 44 marks an overshoe. The body 25 is placed inside of the overshoe at the heel thereof, the clips 28 and 29 engaging the upper edge of the overshoe. The prongs 34 and 38 are extended outwardly through the overshoe and are clenched down thereon as shown at 45. When the bail 39 is in use, the same is swung upwardly as shown in Fig. 5, the finger piece 40 constituting a means whereby the bail may be manipulated. When the bail 39 is not in use, the same is swung downwardly within the contour of the body 25, the bail entering the slits 26, the inwardly flexed portions 27 of the body serving to guide the bail into place within the body 25, and the lip 41 on the bail aiding in accomplishing this result. It is to be observed that the holding members are used to form the pivotal mountings for the bail 39, it being unnecessary to employ a separate and distinct means for pivoting the bail in the body 25.

In carrying out the invention as shown in Figs. 9 to 12 there is provided a body, denoted generally by the numeral 46, and preferably comprising a pair of spaced metallic plates 47 provided in their upper edges with slits 48, the constituent material of the plates 47 being flexed inwardly as shown at 49, adjacent the slits. The upper edges of the plates 47 are supplied with clips 50 and 51, and along the rear edge of each plate there is an outwardly extended flange 52. The numeral 53 marks a flexible bail, preferably made of metal and provided intermediate its ends and upon its upper edge with a finger piece 54, the bail being supplied, below the finger piece, with a lip 55. The bail includes depending arms 56. In each plate 47 there is fashioned an outer opening 57, there being an opening 58 in the plate to the rear of the plate 57, the plate having an opening 59 to the rear of the opening 58 and there being an opening 60 in the plate to the rear of the opening 59. Holding members are assembled with the plates 47, the holding members preferably being in the form of lengths of wire. Each length of wire is extended outwardly through the opening 57 to form a prong 61. Thence, the length of wire extends between the opening 57 and the opening 58, along the inner side of the plate 47, as shown at 62, the length of wire extending outwardly through the opening 58 along the outer side of the plate 47 as shown at 63, inwardly through the opening 59 along the rear side of the plate as shown at 64, and outwardly through the opening 60 to form a prong 65. The arms 56 of the bail 53 are supplied with openings 66, through which pass those portions of the holding members or wires which extend through the openings 58. In this way, pivotal mountings for the bail 53 are afforded.

In practical operation, the body 46, comprising the plates 47, is placed inside of an overshoe 67. The clips 50 and 51 engage the upper edge of the overshoe and aid in holding the plates 47 in place, the function of the flange 52 being to aid in holding the plates on the overshoe. Prongs 61 and 65 are extended outwardly through the overshoe and are clenched down on the outer surface of the overshoe as shown at 68. When the bail 53 is in use, the same is swung upwardly as shown Fig. 9 and serves, obviously, to hold the overshoe 67 in place on the foot of the wearer. The finger piece 54 constitutes means whereby the bail may be manipulated. When the bail is not in use, the same is swung downwardly, and the lip 55 aids in guiding the bail inside of the overshoe at the heel thereof. When the bail is swung downwardly, the bail enters the slits 48, the inwardly flexed portions 49 of the plates 47 aiding in guiding the bail into the slits 48.

Attention is directed to the fact that the bail 53 is pivotally mounted on the holding members, it being unnecessary to provide a separate and distinct means for pivotally connecting the bail 53 with the plates 47.

Having thus described the invention, what is claimed is:—

1. In a device for retaining an overshoe on the foot of the wearer, a body; a bail; and a holding member passing through the body and the bail and having a prong adapted to be clenched on an overshoe, the bail being mounted to swing with respect to the holding member.

2. In a device for retaining an overshoe on the foot of the wearer, a body having slits in its upper edge; a bail disposed partially within the body and having its ends extended outwardly through the slits; and holding members passing through the body, through the ends of the bail and having prongs adapted to be clenched on an overshoe, the bail being mounted to swing with respect to the holding members.

3. A device constructed in accordance with claim 2 and further characterized by the fact that the constituent material of the body is bent inwardly adjacent the slits to guide the bail into the slits when the bail is swung downwardly.

4. A device constructed in accordance with claim 2 and further characterized by the fact that the bail is provided intermediate its ends with a depending lip.

5. A device constructed in accordance with claim 2 and further characterized by the fact that the constituent material of the body is flexed inwardly adjacent the slits to guide the bail into the slits when the bail is swung downwardly, the bail being provided intermediate its ends with a depending lip.

In testimony that I claim the foregoing as my own I have hereto affixed my signature in the presence of two witnesses.

WILLIAM H. TILLSON.

Witnesses:
  FRED G. WOLFE,
  ROLLAND M. WAGNER.

Copies of this patent may be obtained for five cents each, by addressing the "Commissioner of Patents, Washington, D. C."